United States Patent Office 3,039,993
Patented June 19, 1962

3,039,993
POLYETHYLENE STABILIZERS
Lester Friedman, Whitestone, N.Y., assignor to Weston Chemical Corporation, Newark, N.J., a corporation of New Jersey
No Drawing. Filed May 10, 1960, Ser. No. 27,991
10 Claims. (Cl. 260—45.8)

The present invention relates to the stabilization of solid hydrocarbon polymers.

Natural rubber and solid synthetic hydrocarbon polymers and copolymers require stabilization due to the action of air and/or light.

It is an object of the present invention to stabilize solid hydrocarbon polymers and copolymers.

Another object is to enhance the stabilizing effect of tertiary phosphites and thiophosphites on such polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by utilizing a combination of certain tertiary phosphites or thiophosphites with phenolic antioxidants. Surprisingly, the combination of the phosphite or thiophosphite with the phenolic antioxidant shows greatly enhanced stabilizing abilities that are not apparent in like degree in either of the components. This synergistic effect is most pronounced in preventing discoloration and degradation in solid polymers such as polyethylene, polypropylene, polybutene-1, and the copolymer of ethylene and propylene (e.g., a 50:50 copolymer). However, it is also effective in preventing the degradation of polystyrene, natural rubber, rubbery butadiene-styrene copolymer, polybutadiene, polyisobutylene (Vistanex), isobutylene-butadiene copolymer (butyl rubber) and the like.

The polyethylene which is stabilized can be low, high or medium density and can be made by high or low pressure procedures using, for example, catalysts such as Ziegler catalysts (triethyl aluminum-TiCl$_4$) or Phillips catalysts. A typical polyethylene which can be stabilized is Alathon 14 (a polyethylene of molecular weight about 20,000 having a low density and made by a high pressure process).

The synergistic stabilizer systems are effective in very small concentrations, e.g., 0.1 to 0.5% by weight of the polymer. Larger quantities of the stabilizer mixture, e.g., up to 10% by weight of the polymer, can be employed, although there is normally not sufficient improvement to justify the increase in expense. The phosphite and phenol can be used in an amount ranging from 1 to 10 mols of phosphorus compound to 10 to 1 mols of phenolic compound. Preferably, 2 equivalents of phosphite are employed for each phenolic hydroxyl in the phenol.

The phosphite ester employed preferably should not have a high vapor pressure at the working or extrusion temperature of the polymer. For this reason the ester employed usually has a higher alkyl group, e.g., 8 to 18 carbon atoms, or has an aryl group. The phosphites and thiophosphites can be aliphatic including cycloaliphatic, aromatic, heterocyclic or mixtures of such materials.

As the stabilizers there can be employed alkyl, aryl, alkoxyaryl and heterocyclic phosphites and thiophosphites of the formula

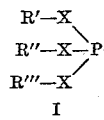

I where R', R" and R''' are alkyl, cycloalkyl, aryl, alkoxyalkyl, aralkyl or tetrahydrofurfuryl and X is oxygen or sulfur.

Typical examples of such phosphites and thiophosphites are trimethyl phosphite, trimethyl thiophosphite, triethyl phosphite, triethyl trithiophosphite, tributyl phosphite, triisobutyl phosphite, tri secondary butyl phosphite, tri tertiary butyl phosphite, tributyl trithiophosphite, tributyl dithiophosphite, tributyl monothiophosphite, trihexyl phosphite, trihexyl trithiophosphite, tricyclohexyl phosphite, tricyclohexyl trithiophosphite, tri-2-ethylhexyl phosphite, tri-2-ethylhexyl trithiophosphite, triisooctyl phosphite, tridecyl phosphite, tridecyl dithiophosphite, trilauryl phosphite, trilauryl trithiophosphite, trilauryl dithiophosphite, trilauryl monothiophosphite, trioctadecyl phosphite, trioctadecyl trithiophosphite, trieicosanyl phosphite, phenyl didecyl phosphite, phenyl didecyl trithiophosphite, phenyl dilauryl phosphite, phenyl distearyl phosphite, phenyl distearyl trithiophosphite, diphenyl decyl phosphite, diphenyl lauryl phosphite, diphenyl stearyl phosphite, diphenyl stearyl trithiophosphite, triphenyl phosphite, triphenyl trithiophosphite, triphenyl dithiophosphite, triphenyl monothiophosphite, tri p-cresyl phosphite, tri m-cresyl phosphite, tri o-cresyl phosphite, tri p-cresyl dithiophosphite, tri p-octyl phenyl trithiophosphite, tri p-octylphenyl phosphite, triethoxyethyl phosphite, tributoxyethyl phosphite, tritetrahydrofurfuryl phosphite, tritetrahydrofurfuryl trithiophosphite, triphenyl ethyl phosphite, S-phenyldilauryl monothiophosphite, S-phenyldidecyl monothiophosphite, S,S-diphenyl lauryl dithiophosphite, S,S-diphenyldecyl dithiophosphite, tri α-naphthyl phosphite, tri β-naphthyl phosphite, S,S-diphenyldecyl dithiophosphite, phenyldilauryl trithiophosphite, tri p-dodecylphenyl phosphite, tri o-chlorophenyl phosphite, tri m-chlorophenyl phosphite, diphenyllauryl trithiophosphite, S-lauryldiphenyl monothiophosphite, tri p-chlorophenyl phosphite, tri p-chlorophenyl trithiophosphite, tri p-methoxyphenyl phosphite, S,O-diphenyl-S-lauryl dithiophosphite, tri o-methoxyphenyl dithiophosphite, S,S-dilauryl phenyl dithiophosphite, and S,O-dilauryl-S-phenyl dithiophosphite.

The preferred phosphite esters are stabilizing materials according to the invention, however, are cyclic phosphites or pentaerythritol derivatives of one of the following formulae

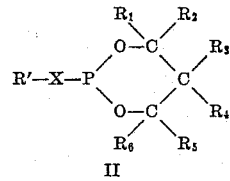

II

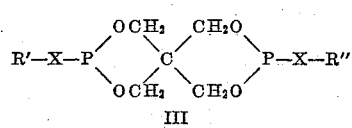

III

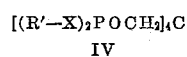

IV where R' and R" are as defined above and can be methyl, ethyl, propyl, butyl, isobutyl, secondary butyl, tertiary butyl, amyl, hexyl, heptyl, octyl, isooctyl, 2-ethylhexyl, decyl, isodecyl, lauryl, tetradecyl, cetyl, octadecyl (stearyl), eicosanyl, ethoxyethyl, butoxyethyl, methoxyethyl, tetrahydrofurfuryl, phenylethyl, aryl or haloaryl, e.g., phenyl, o-tolyl (o-cresyl), m-tolyl, p-tolyl, o-ethylphenyl, p-ethylphenyl, p-t-butylphenyl, o-t-butylphenyl, m-t-butylphenyl, p-octylphenyl, p-nonylphenyl, p-decylphenyl, p-dodecylphenyl, benzylphenyl, o-phenylphenyl, p-phenylphenyl, o-chlorophenyl, m-chlorophenyl, p-chlorophenyl, o-bromophenyl, p-fluorophenyl, m-iodophenyl, o-methoxyphenyl, p-methoxyphenyl, m-methoxyphenyl, α-naphthyl and β-naphthyl. In the formulae $R_1$, $R_2$, $R_3$, $R_4$, $R_5$ and $R_6$ are hydrogen or alkyl groups of 1 to 20 carbon atoms, e.g., methyl, ethyl, propyl, isopropyl, butyl, secondary butyl, tertiary butyl, amyl, hexyl, decyl, dodecyl and eicosanyl and X is oxygen or sulfur.

The dioxaphospholanes do not perform satisfactorily as stabilizers according to the invention.

As the cyclic phosphites and/or the pentaerythritol phosphites which can be used in the present invention there may be mentioned all of the dioxaphosphorinanes disclosed in Hechenbleikner et al. Patent 2,834,798, e.g., on column 2, line 55, to column 3, line 31, and in Examples 8-11 and 60-100 and in McManimie Patent 2,893,961, as well as the pentaerythritol phosphites disclosed in Hechenbleikner Patent 2,847,443, column 2, line 40, to column 5, line 8 and Examples 1-4. The cyclic compounds can be prepared as shown in the Hechenbleikner and McManimie patents.

The present invention is not limited, however, to the use of the phosphites disclosed in the Hechenbleikner et al. and McManimie patents but instead embraces all of the phosphites and thiophosphites coming within Formulae I to IV supra. Typical examples of stabilizers coming within Formulae II to IV which can be employed are 2-phenoxy-1,3,2-dioxaphosphorinane (phenyl trimethylene phosphite), 2-cyclohexyloxy-1,3,2-dioxaphosphorinane, 2 - methoxy - 1,3,2 - dioxaphosphorinane, 2-ethoxy-1,3,2-dioxaphosphorinane, 2-secondary butoxy-1,3,2-dioxaphosphorinane, 2-isopropoxy-1,3,2 - dioxaphosphorinane, 2-amyloxy - 1,3,2 - dioxaphosphorinane, 2-octyloxy-1,3,2-dioxaphosphorinane, 2-decyloxy - 1,3,2 - dioxaphosphorinane, 2 - octadecyloxy - 1,3,2 - dioxaphosphorinane, 2 - decyloxy - 5,5 - dimethyl - 1,3,2 - dioxaphosphorinane, 2-decyloxy-5-ethyl-5-methyl - 1,3,2 - dioxaphosphorinane, 2 - decyloxy - 5,5 - diethyl - 1,3,2 - dioxaphosphorinane, 2-decyloxy-4,4,6 - trimethyl - 1,3,2 - dioxaphosphorinane, 2-octadecyl-oxy - 5,5 - dimethyl - 1,3,2 - dioxaphosphorinane, 2-methoxy-5,5-dimethyl - 1,3,2 - dioxaphosphorinane, 2-phenoxy-4 - methyl - 1,3,2 - dioxaphosphorinane, 2-phenoxy-5,5-dimethyl-1,3,2-dioxaphosphorinane, 2-phenoxy-4,4,6-trimethyl-1,3,2-dioxaphosphorinane, 2-octadecyloxy-4,4,6-trimethyl-1,3,2 - dioxaphosphorinane, 2-phenoxy-4-propyl-5-ethyl-1,3,2-dioxaphosphorinane, 2-phenoxy-4,6-dimethyl-1,3,2-dioxaphosphorinane, 2-phenoxy - 4 - ethyl-5-methyl-1,3,2 - dioxaphosphorinane, 2 - phenoxy - 5,5-diethyl-1,3,2 - dioxaphosphorinane, 2 - phenoxy - 4 - propyl-1,3,2-dioxaphosphorinane, 2-(2-chloro)phenoxy-4,4,6-trimethyl - 1,3,2 - dioxaphosphorinane, 2-(4-octyl) phenoxy-4,4,6-trimethyl-1,3,2 - dioxaphosphorinane, 2-(2-methyl) phenoxy - 1,3,2 - dioxaphosphorinane, 3,9 - diphenoxy-2,4,8,10-tetraoxa-3,9-diphosphaspiro [5,5] undecane (diphenyl pentaerythritol diphosphite), 3,9 - didecyloxy-2,4,8,10 - tetraoxa - 3,9 - diphosphaspiro [5,5] undecane (didecyl pentaerythritol diphosphite), 3,9-dioctadecyloxy-2,4,8,10-tetraoxa-3,9-diphosphaspiro [5,5] undecane (distearyl pentaerythritol diphosphite), 3-decyloxy-9-phenyloxy-2,4,8,10-tetraoxa-3,9-diphosphaspiro [5,5] undecane (phenyl decyl pentaerythritol diphosphite), 3-octadecyloxy-9-phenyloxy-2,4,8-10-tetraoxa-3,9 - diphosphaspiro [5,5] undecane, 3,9-dimethoxy-2,4,8,10-tetraoxa-3,9-diphosphaspiro [5,5] undecane, 3,9-di p-tolyloxy-2,4,8,10-tetraoxa-3,9-diphosphaspiro [5,5] undecane, 3,9-di o-chlorophenoxy-2,4,8,10 - tetraoxa - 3,9 - diphosphaspiro [5,5] undecane, 2 - phenylethoxy - 1,3,2 - dioxaphosphorinane, 2-benzyloxy-1,3,2-dioxaphosphorinane, 3,9-dibenzyloxy-2,4,8,10 - tetraoxa - 3,9 - diphosphaspiro [5,5] undecane, 3,9-dicyclo-hexyloxy 2,4,8,10-tetraoxa-3,9-diphosphaspiro [5,5] undecane, octamethyl pentaerythritol tetraphosphite ($[(CH_3O)_2$—P—$OCH_2]_4C$), octabutyl pentaerythritol tetraphosphite, octaoctadecyl pentaerythritol tetraphosphite, octaphenyl pentaerythritol tetraphosphite

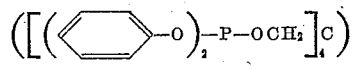

octatolyl pentaerythritol tetraphosphite, tetraphenyl tetrabutyl pentaerythritol tetraphosphite, 2-dodecylthio-5,5-dimethyl - 1,3,2 - dioxaphosphorinane, 2 - phenylthio-5,5-dimethyl-1,3,2-dioxaphosphorinane, 2-dodecylthio-1,3,2-dioxaphosphorinane, 2-phenylthio-1,3,2-dioxaphosphorinane, 3-phenylthio-9-decyloxy - 2,4,8,10 - tetraoxa - 3,9-diphosphaspiro [5,5] undecane, 3-phenylthio - 9 - dodecylthio-2,4,8,10-tetraoxa-3,9-diphosphaspiro [5,5] undecane, 3,9-di (phenylthio) - 2,4,8,10-tetraoxa-3,9-diphosphaspiro [5,5] undecane, 3-dodecylthio-9-phenyloxy-2,4,8,10-tetraoxa-3,9-diphosphaspiro [5,5] undecane, 3,9-bis-(dodecylthio)-2,4,8,10-tetraoxa-3,9-diphosphaspiro [5,5] undecane, 3-dodecylthio-9-decyloxy-2,4,8,10 - tetraoxa-3,9-diphosphaspiro [5,5] undecane, octalauryl pentaerythritol tetrathiophosphite ($[(C_{12}H_{25}S)_2$—P—$OCH_2]_4C$), octaphenyl pentaerythritol tetrathiophosphite, tetramethyl tetraphenyl pentaerythritol tetrathiophosphite.

Preferably the alkyl group in the alkyl phosphites and thiophosphites has at least 6 carbon atoms since this reduces the volatility of the stabilizer.

The preferred phosphite and thiophosphite suitable as stabilizers with the phenolic adjuvant are the 1,3,2-dioxaphosphorinanes and the 2,4,8,10-tetraoxa-3,9-diphosphaspiro [5,5] undecanes.

In those cases where the thiophosphites are new compounds they can be formed in the same manner as the phosphites by replacing the appropriate alcohol by the corresponding mercaptan.

The terms "tertiary phosphite" and "tertiary thiophosphite" in the specification and claims are used in their normal sense to mean a phosphite in which all three valences of the phosphorus atoms are satisfied by a chalcogen atom which, in turn, is directly attached to a carbon atom. The terms "a tertiary hydrocarbon phosphite" and "a tertiary hydrocarbon thiophosphite free of non-benzenoid unsaturation" are intended to cover those members of the above class of phosphites and thiophosphites which are alkyl, aryl, aralkyl, or cycloalkyl phosphites or thiophosphites.

As examples of phenolic antioxidants which act synergistically with the tertiary phosphites and thiophosphites to stabilize the hydrocarbon polymers there may be mentioned alkyl and aralkyl phenols having 4 to 24 carbon atoms in the substituent group or groups, e.g., butyl phenol, secondary butyl phenol, tertiary butyl phenol, amyl phenol, octyl phenol, nonyl phenol, decyl phenol, dodecyl phenol, octadecyl phenol, oleyl phenol, cardanol, 2,4-didodecyl phenol, 2,4-dibutyl phenol, 3,5-diamylphenol, dinonyl phenol, didodecyl phenol, di-t-butyl-o-methyl phenol, di-t-butyl-p-methyl phenol, o-phenyl phenol, p-phenyl phenol, 2-methyl-4-tolyl phenol, 2,4-dimethyl-5-phenyl phenol, p-benzyl phenol, 2-t-butyl-m-cresol, o-t-butyl phenol, 2,6-di-t-butyl phenol, 2,6-diethyl phenol, 2,4,6-tri-t-butyl phenol, t-butyl-hydroquinone, 2,5-di-t-butylhydroquinone, o-octyl phenol, 2,2-bis-(p-hydroxyphenyl) propane, 2,2'-methylene bis-(4-methyl-6-t-butyl phenol), 2,6-di-t-butyl-4-methyl phenol, 2,2'-methylene bis-(4,6-di-t-butyl phenol), 2,2'-thiobis-(4-methyl-6-t-butyl phenol). There can be employed any of the phenols disclosed in Myers Patent 2,820,774. In place of the free phenol, there can be employed the salts, e.g., the polyvalent metal salts thereof, e.g., barium nonyl phenolate, strontium amyl phenolate, cadmium dodecyl phenolate. In connection with the bis phenols, preferably, none of the alkyl substituents has over four carbon atoms.

Unless otherwise stated, all parts and percentages are by weight.

Example 1

1000 grams of virgin solid polypropylene prepared via the Ziegler method was liquefied by heating. To the liquid melt was added 2.5 grams of 3,9-distearyloxy-2, 4,8,10-tetraoxa-3,9-diphosphaspiro [5,5] undecane (M.W. 732, 8.5% phosphorus, 0.0034 mol, 0.0068 equivalent phosphite) and 2.3 grams of 2,2'-methylene bis-(4-methyl-6-t-butyl phenol) (M.W. 340, 0.0068 mol). The resulting mixture was extruded at 350–360° F. to form film and polypropylene chips. A disc formed by die casting some of the stabilized material was clearly transparent and colorless. The film after exposure to the atmosphere and light for two weeks was colorless and odorless. Unstabilized material rapidly turned yellow-brown.

Thus, stabilization with a phosphite ester-hindered phenol combination allowed the extrusion and casting of polypropylene without the formation of color bodies or polymer degradation. The absence of degradation was measured by comparing the intrinsic viscosity of the extruded or worked polymer with that of the virgin polypropylene.

Similar results were obtained by using combinations of the aforementioned phosphites and phenols with other samples of polypropylene and polyethylene.

Example 2

Example 1 was repeated by replacing the polypropylene by Alathon 14 polyethylene and extruding at a temperature of 275° F. The extruded polyethylene was effectively stabilized.

Example 3

1000 grams of linear polyethylene of high molecular weight (prepared from ethylene at a pressure of about 50 atm. at room temperature utilizing a dibutyl beryllium-titanium tetrachloride catalyst) were liquefied by heating. To the melt was added 4.0 grams of trilauryl trithiophosphite and 3.5 grams of 2,4,6-tri-t-butyl phenol. The resulting mixture was extruded as in Example 1 to form a stabilized film even upon heating. The polyethylene employed in this example is one which is known to discolor badly in the absence of a stabilizer.

What is claimed is:

1. A solid polymer of an olefin having 2 to 3 carbon atoms stabilized with a mixture of a phenolic antioxidant selected from the group consisting of hydrocarbon substituted phenols having a total of 4 to 24 carbon atoms in the hydrocarbon substituents, 2,2'-methylene bis-4,6-dialkyl phenols, 2,2'-bis-(p-hydroxyphenyl) propane and 2,2' thiobis-4,6-dialkyl phenols and a tertiary hydrocarbon thiophosphite free of nonbenzenoid unsaturation.

2. A solid polymer of an olefin having 2 to 3 carbon atoms stabilized with a mixture of heterocyclic phosphite which is a 1,3,2-dioxaphosphorinane having up to three lower alkyl groups attached to carbon atoms of the dioxaphosphorinane ring and having the free valences of the phosphorus attached to a chalcogen of atomic weight 16 to 32 which in turn is attached to a hydrocarbon group free of nonbenzenoid unsaturation and a phenolic antioxidant selected from the group consisting of hydrocarbon substituted phenols having a total of 4 to 24 carbon atoms in the hydrocarbon substituents, 2,2'-methylene bis-4,6-dialkyl phenols, 2,2'-bis-(p-hydroxyphenyl) propane and 2,2' thiobis-4,6-dialkyl phenols.

3. A composition according to claim 2 wherein the dioxaphosphorinane is a 2-alkoxy-1,3,2-dioxaphosphorinane.

4. A composition according to claim 2 wherein the dioxaphosphorinane is a 2-alkylthio-1,3,2-dioxaphosphorinane.

5. A composition according to claim 2 wherein the dioxaphosphorinane is a 2-arylchalcogeno-1,3,2-dioxaphosphorinane.

6. A composition according to claim 2 wherein the heterocyclic phosphite is a 2,4,8,10-tetraoxa-3,9,-diphosphaspiro [5,5] undecane having the free valence of each of the two phosphorus atoms attached to a chalcogen of atomic weight 16 to 32 which in turn is attached to a hydrocarbon group.

7. A composition according to claim 6 wherein the diphosphaspiro undecane is a 3,9-dihydrocarbonoxy-2,4,8,10-tetraoxa-3,9-diphosphaspiro [5,5] undecane, wherein the hydrocarbon groups are free of nonbenzenoid unsaturation.

8. A composition according to claim 6 wherein the free valence of one phosphorus atom is attached to oxygen and the free valence of the other phosphorus atom is attached to sulfur.

9. A composition according to claim 6 wherein the dioxaphosphaspiro undecane is a 3,9-dihydrocarbonthio-2,4,8,10 - tetraoxa - 3,9 - diphosphaspiro [5,5] undecane, wherein the hydrocarbon groups are free of nonbenzenoid unsaturation.

10. Polypropylene stabilized with a mixture of 3,9-distearyloxy - 2,4,8,10 - tetraoxa - 3,9 - diphosphaspiro [5,5] undecane and 2,2'-methylene bis-(4-methyl-6-t-butyl phenol).

References Cited in the file of this patent

UNITED STATES PATENTS

| | | |
|---|---|---|
| 2,834,768 | Friedlander | May 13, 1958 |
| 2,834,798 | Hechenbleikner et al. | May 13, 1958 |
| 2,847,443 | Hechenbleikner et al. | Aug. 12, 1958 |
| 2,935,491 | Mack | May 3, 1960 |
| 2,985,617 | Salyer et al. | May 23, 1961 |